US010240746B2

(12) United States Patent
Greene et al.

(10) Patent No.: US 10,240,746 B2
(45) Date of Patent: Mar. 26, 2019

(54) FIBER OPTIC LIGHT PANEL WITH HOMOGENEOUS LIGHT OUTPUT

(71) Applicant: Valeo North America, Inc., Troy, MI (US)

(72) Inventors: Kayla Greene, Seymour, IN (US); John Orisich, Seymour, IN (US); Brant Potter, Seymour, IN (US); Mark Madden, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 29 days.

(21) Appl. No.: 15/210,189

(22) Filed: Jul. 14, 2016

(65) Prior Publication Data
US 2018/0017227 A1    Jan. 18, 2018

(51) Int. Cl.
*F21V 9/02*    (2018.01)
*F21S 43/237*    (2018.01)
*F21V 8/00*    (2006.01)
*F21S 43/14*    (2018.01)
*F21S 43/145*    (2018.01)
*F21S 43/239*    (2018.01)
*F21S 43/245*    (2018.01)
*F21S 41/24*    (2018.01)
*G02B 6/04*    (2006.01)
*F21S 43/241*    (2018.01)
*F21S 43/251*    (2018.01)
*G02B 27/09*    (2006.01)

(52) U.S. Cl.
CPC ............. *F21S 43/237* (2018.01); *F21S 41/24* (2018.01); *F21S 43/14* (2018.01); *F21S 43/145* (2018.01); *F21S 43/239* (2018.01); *F21S 43/241* (2018.01); *F21S 43/245* (2018.01); *F21S 43/251* (2018.01); *G02B 6/001* (2013.01); *G02B 6/0003* (2013.01); *G02B 6/0006* (2013.01); *G02B 6/008* (2013.01); *G02B 6/04* (2013.01); *G02B 6/0008* (2013.01); *G02B 27/0927* (2013.01); *G02B 27/0994* (2013.01)

(58) Field of Classification Search
CPC .... G02B 6/0006; G02B 6/0005; G02B 6/001; F21S 43/237
USPC ........................................................ 362/511
See application file for complete search history.

(56) References Cited

U.S. PATENT DOCUMENTS 5,021,928 A * 6/1991 Daniel ................ B29C 47/0019
                                            362/293
5,042,900 A * 8/1991 Parker ..................... G02B 6/26
                                            385/76

(Continued)

FOREIGN PATENT DOCUMENTS

EP        0359450 A2    3/1990

*Primary Examiner* — Anh T Mai
*Assistant Examiner* — Matthew J. Peerce
(74) *Attorney, Agent, or Firm* — Oblon, McClelland, Maier & Neustadt, L.L.P.

(57) ABSTRACT

An optical mixer for a vehicle lighting device having a light source and an optical fiber panel that inputs light from the light source. The optical mixer includes a light input face configuration to input light from the light source, and a light output face configured to output light to the input to panel. A sidewall connects the light input face to the light output face. The optical mixer is configured to provide output light from the output face having greater spatial uniformity than input light entering the input face.

19 Claims, 5 Drawing Sheets

(56) References Cited

U.S. PATENT DOCUMENTS

| | | | | |
|---|---|---|---|---|
| 5,568,964 A | * | 10/1996 | Parker | D03D 1/0088 156/88 |
| 5,690,408 A | * | 11/1997 | de la Pena | B60Q 1/0011 362/470 |
| 6,270,244 B1 | * | 8/2001 | Naum | G02B 6/0006 359/238 |
| 2009/0040598 A1 | * | 2/2009 | Ito | A61B 1/0638 359/332 |
| 2009/0161378 A1 | * | 6/2009 | Enz | B60Q 1/2665 362/494 |
| 2015/0309272 A1 | * | 10/2015 | Cobb | G02B 6/4256 385/93 |

* cited by examiner

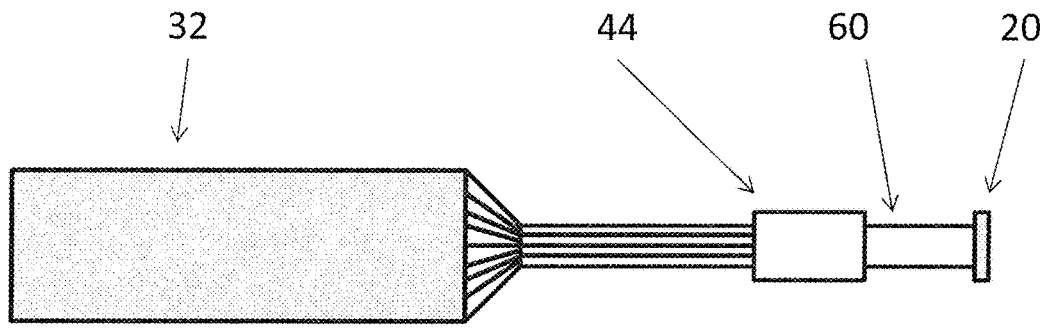
FIG. 1
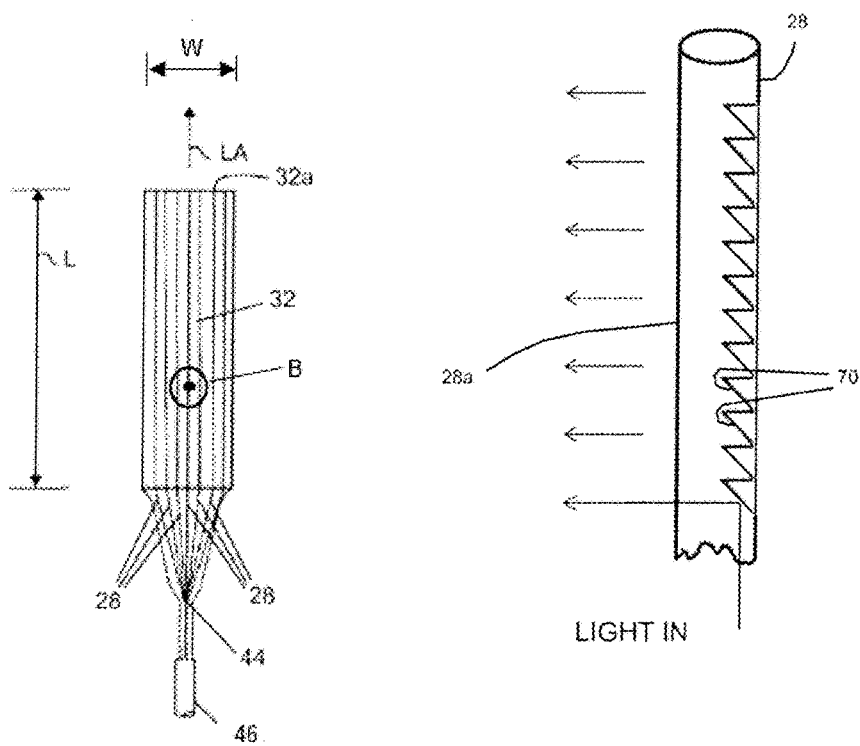
FIG. 2  FIG. 3

FIBER OPTIC LIGHT PANEL WITH HOMOGENEOUS LIGHT OUTPUT

FIELD OF THE INVENTION

This invention relates to lighting systems, and more particularly to a lighting and/or signaling device that utilizes fiber optic light panels.

BACKGROUND OF THE INVENTION

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, at the date of this filing Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

It is difficult to provide aesthetically appealing vehicle lighting devices that meet the required technical specifications. For example, taillights on existing cars tend to be power hungry and need various components, such as reflectors. Head lamps are similar in that they require multiple components, such as reflectors, cut off devices and the like. Aesthetic lighting effects lead to an even greater number of components and complexity. Such vehicle lighting devices are not easily adapted to the styling of the vehicle.

In recent years some vehicle manufacturers are utilizing organic light-emitting diodes (OLED) in an effort to meet desired lighting and aesthetic characteristics of vehicle lighting. OLED devices generally take the form of very thin panels that can be formed into three-dimensional shapes. Fiber panel LEDs may have a similar panel form to OLEDs. For example, U.S. Pat. No. 6,874,925 discloses fiber optic light emitting panel assemblies. However, these assemblies have generally been limited to electronics backlighting, surgical devices, phototherapy and other applications not subject to the technical requirements of vehicle lighting.

SUMMARY OF THE INVENTION

It is one object of the invention to provide an optical mixer adapted to improve homogeneity of a fiber optic light panel.

It is another object of the invention to provide a fiber optic light panel device that can meet the technical and aesthetic requirements for vehicle lighting.

Another object of the invention is to provide a fiber optic light panel device that can conform to the styling of a vehicle.

Yet another object of the invention is to provide a fiber optic light panel device that provides desired lighting effects to enhance aesthetics of the vehicle design.

Still another object of the invention is to provide a fiber optic light panel device as a lower cost alternative to OLED panel lighting devices.

Another object of the invention is to provide a fiber optic light panel device as a more reliable alternative to OLED panel lighting devices.

These and/or other objects may be provided by embodiments of the invention disclosed herein. In one embodiment an optical mixer is provided for a vehicle lighting device having a light source and an optical fiber panel which inputs light from the light source. The optical mixer includes a light input face configuration to input light from the light source, and a light output face configured to output light to the input to panel. A sidewall connects the light input face to the light output face. The optical mixer is configured to provide output light from the output face having greater spatial uniformity than input light entering the input face. The optical mixer may further include a reflective coating at least partially covering the sidewall. The optical mixer can include at least one of phosphors and disruptions suspended in the optical mixer, and the optical mixer may be a solid piece of plastic material.

In another example embodiment, a lighting device for a vehicle includes a light source for generating light, a light panel including a plurality of optical fibers arranged in a predetermined form, and a bundling element for bundling ends of the optical fibers of the light panel together. An optical mixer is interposed between the light source and the bundling element. The optical mixer is configured to receive at least a portion of the light from the light source, mix the light and transmit mixed light to the bundling element. The light source can include a light emitting diode.

The plurality of optical fibers can be arranged in an array, or arranged in a woven configuration.

The bundling element can include a ferrule configured to hold the plurality of fibers in a bundle having a predetermined cross-sectional shape. The bundling element can also include adhesive configured to hold the plurality of fibers in the predetermined cross-sectional shape.

The optical mixer may include a body having a first surface optically coupled to the light source, a second surface optically coupled to the bundling element and a sidewall extending longitudinally from the first surface to the second surface. A reflective coating may be provided on the sidewall of the body. The optical mixer may further include particles and/or disruptions in the body of the optical mixer. The sidewall of the optical mixer may be tapered. The first surface of the optical mixer can have a different surface area than a surface area of the second surface. The first surface of the optical mixer can be shaped to conform to at least one of a geometry and a radiation pattern of the light source, and the second surface of the optical mixer can be shaped to conform to the fiber bundle element.

Yet another embodiment includes a method of manufacturing a lighting device for a vehicle. The method includes providing a light source for generating light, providing a light panel including a plurality of optical fibers arranged in a predetermined form, and bundling ends of the optical fibers of the light panel together to form an input to the light panel. An optical mixer is provided between the light source and the bundling element, the optical mixer having a geometry which mixes light from the light source to provide mixed light having greater spatial uniformity for coupling to the light panel. The optical mixer may have a diameter to length ratio D:L of at least 3.3:1. Further, the optical mixer may have a diameter equal to a fiber bundle diameter determined by y=0.008x+2.075, where y is the bundled fibers diameter and x is the number of fibers in the bundle.

BRIEF DESCRIPTION OF THE DRAWINGS

In the Drawings:

FIG. 1 is a schematic view of a fiber optic light panel device in accordance with embodiments of the invention;

FIG. 2 is a planar view of a fiber optic light panel used in a lighting device according to embodiments of the invention;

FIG. 3 is a schematic view of an optical fiber adapted to emit light along a length of the optical fiber;

DETAILED DESCRIPTION OF SEVERAL EMBODIMENTS

Figure 4:
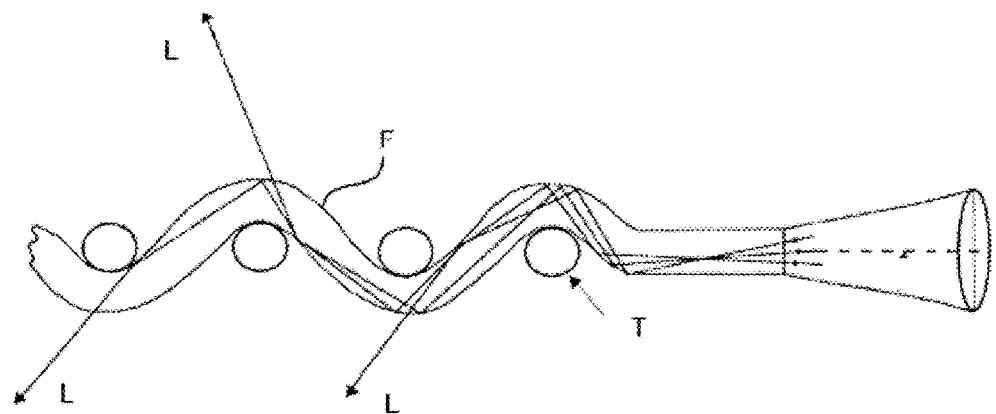
FIG. 4 is a schematic view of another optical fiber adapted to emit light along a length of the optical fiber.

Fiber optic light panels have previously been used in displays and electronics backlighting. U.S. patent application serial no. PCT/US2015/036629 (unpublished) titled Fiber Optic Lighting And/or Signaling System for a Vehicle, filed on Jun. 19, 2015 by the same Applicant as the present application, discloses a fiber optic light panel device for exterior lighting of vehicles. The entire contents of this application are incorporated herein by reference.

A fiber optic light panel assembly generally includes a light source that inputs light to a fiber bundle having fibers extending therefrom to form a light panel. The present inventors have recognized that such fiber optic panels may have an uneven light output intensity across the area of the panel, which is undesirable aesthetically. In particular, the homogeneity of the fiber optic panel light output is inferior to that of OLEDs. The inventors further recognized that this problem of uneven light output of fiber optic panels, known as "streaking," becomes more noticeable at higher light outputs of the fiber optic light panel.

Conventional low power fiber optic panels have addressed optical coupling of the light source light to the fiber panel. For example, U.S. Pat. No. 7,305,163 uses optical lenses to collimate or shape the light source output to be compatible with the light input to a fiber panel. U.S. Pat. No. 6,733,187 uses various connector assemblies to control the cross sectional area of an input to the fiber panel to be compatible with the light source output. Thus, these approaches address angular variation of the light source coupling to the fiber panel. The present inventors discovered, however, that such coupling modifications cannot provide the desired level of homogenous light output from the fiber optic panel. Specifically, the inventors discovered that the streaking problem of fiber optic light panel devices is closely related to spatial intensity variations in the output radiation pattern of the light source itself. The inventors further recognized that higher power light sources often needed to satisfy light output requirements for vehicle lighting tend to have greater spatial intensity variation, which causes homogeneity at the light panel output to worsen.

FIG. 1 is a schematic representation of a lighting system in accordance with an embodiment of the invention. The lighting system 10 includes a light source 20, an optical mixer 60, a fiber bundle 44, and a fiber panel 32. The light source 20 generates light for coupling to the fiber panel 32, which emits light from a surface thereof to meet the desired lighting function. The fiber bundle 44 groups fibers of the panel 32 in a configuration suitable for accepting light into the fiber panel 32.

The optical mixer 60 is interposed between the light source 20 and fiber bundle 44. The optical mixer 60 accepts light from the light source 20 and outputs light to the fiber bundle 44. The optical mixer 60 mixes the light, at least in part by total internal reflection (TIR), as the light travels along the mixer such that a light output from the mixer has greater spatial uniformity than that of the light source 20 light input to the optical mixer 60. In certain configurations, this arrangement can permit each fiber in the fiber bundle 44 to receive approximately the same amount of light flux input, which provides a more homogeneous light output across the fiber optic light panel 32. The optical mixer 60 may also function to shape the light output to be compatible with the fiber bundle 44.

The light source 20 may be any suitable source for generating light having photometric characteristics to provide a desired light output from panel 32. For example, the light source 20 may provide a lambertion pattern or any other radiation pattern of suitable flux, wavelength and intensity to satisfy the lighting function or aesthetic lighting effects of the panel 32.

The light source 20 may include one or more light emitting devices or solid state light sources. The term "solid state" generally refers to light emitted by solid-state electroluminescence, as opposed to incandescent bulbs or fluorescent tubes. For example, the light source 20 may include a semiconductor light emitting diode (LED) or laser diode, an OLED, polymer light emitting diode (PLED), an LED lamp package, LED chip or LED die, or an array of one or more of these devices. Where a plurality of LEDs is used, they can be the same or different colors. It should be understood that the light source 20 could be multiple discrete LEDs or an LED light bar. A conventional printed circuit board (PCB) having one or more LEDs could be used with the optical fiber panel 32. In one example, the light source may be an LED providing a 2 W, 140 lm output at 2.65 v. and 750 mA of current. Alternatively, 860 mA, 6.29 V, 510 lm white 1×2 LED source may be provided as light source 20. Halogen bulbs and/or an HID source may also be used.

FIG. 2 is a view of a fiber optic light panel used in a lighting system according to embodiments of the invention. The fiber optic light panel 32 includes a plurality of optical fibers 28 that extend along a length L of the panel 32, terminating at an end 32a of the panel. The fibers 28 are arranged in an array along a width W such that they define a generally planar and generally rectangular panel 32. The panel 32 may assume other arrangements and forms, and is not limited to rectangularity and/or straight lines. For example, the panel 32 may have a width W that generally exceeds a length L. In example embodiments, the panel 32 is pliable and flexible, and may be adapted to be received in a support or frame which may define a three dimensional form of the light panel 32.

In the embodiment of FIG. 2, the plurality of optical fibers 28 are arranged in a generally parallel relationship with respect to each other and with respect to a longitudinal axis LA of the panel 32. However, it should be understood that the plurality of optical fibers 28 may assume similar or different positions (e.g., parallel, non-parallel, curved, arcuate or serpentine). For example, some of the plurality of optical fibers 28 may be straight while others are not. Further, although the plurality of optical fibers 28 are shown extending along the entire length L of the panel 32, respectively, some or all of the plurality of optical fibers 28 could extend less than the entire length. The plurality of optical fibers 28 could be longer than the length L and arranged, for example, in a circular, elliptical, polygonal or other pattern within the panel 32. Also, the plurality of optical fibers 28 may have different sizes or dimensions, such as different diameters. Thus, the plurality of optical fibers 28 can be different shapes, dimensions and sizes and are adapted and arranged in the predetermined form depending on the light pattern or lighting function desired.

It should be understood that the panel 32 may include any number of fibers 28 depending on the environment in which they are going to be used. In some of the embodiments, there are approximately fifty (50) fibers of 0.23 mm diameter per panel 32, or 100 fibers per inch width W (per layer). Obviously, these are just illustrations and other numbers and sizes of fibers 28 could be used.

A conventional optical fiber generally transmits light through total internal reflection (TIR) from an input end to an output end of the fiber. According to embodiments of the invention, the fibers 28 of the optical light panel system 10 are configured and/or arranged such that light is emitted along a length of the fibers 28 making the panel 32 illuminate in a direction that is generally not parallel with a longitudinal axis LA of the fiber, as shown by point B in FIG. 2, which represents light rays coming out of the plane of the page.

FIG. 3 is a schematic view of an optical fiber adapted to emit light along a length of the optical fiber. To facilitate the light being emitted generally transverse to a longitudinal axis of the fiber 28, the fiber 28 may be modified to include optics such as a plurality of facets or reflective surfaces 70 which direct or reflect the light through a surface 28a of the fiber 28. Altering the fibers 28 to direct light in the desired direction can be achieved through a variety of methods including, but not limited to: providing the plurality of facets or reflective surfaces 70 as mentioned, laser ablating a surface of the fiber 28, mechanical abrasion of a surface of each fiber 28, etc.

FIG. 4 is a schematic view of another optical fiber adapted to emit light along a length of the optical fiber. It has been found that wrapping or curving the fiber may also cause light L to exit a side surface of the fiber F as shown in FIG. 4. Thus, causing at least one or a plurality of the optical fibers 28 to be curved along their longitudinal axis can enable the fibers to emit light or illuminate into a predetermined or desired direction, such as the direction indicated by point B in FIG. 2. It is desirable to capitalize on this feature by providing a woven pattern of the plurality of optical fibers 28 with fill thread T in order to generate a predetermined lighting function or result. A variety of weave patterns may be selected to produce a desired lighting function, effect or characteristic.

Figure 5A:
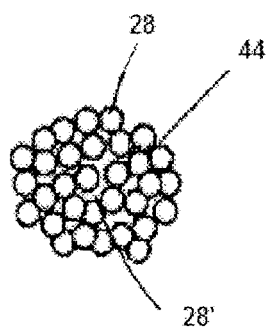
FIGS. 5A and 5B show alternative embodiments of a fiber bundle used in a lighting device in accordance with embodiments of the invention.
Figure 5B:
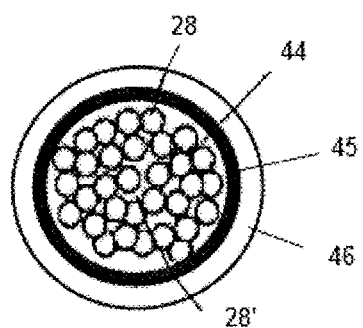

Returning to FIG. 2, the plurality of optical fibers 28 extend out of the panel 32 and are gathered and combined in a bundle 44 which functions as a light-receiving end or input end of the panel 32. The fiber bundle 44 may include any bundling element or substance suitable to maintain the fibers 28 in a predetermined cross sectional shape. FIGS. 5A and 5B show alternative embodiments of a fiber bundle 44 and bundling elements used in a lighting system in accordance with embodiments of the invention. As seen in FIG. 5A, the fiber bundle 44 may be maintained by adhesive 28' provided between the fibers 28 as the bundling element to bond the fibers together. Alternatively, the fiber bundle 44 may be maintained by a coupling, 46 (such as a ferrule) as shown in FIG. 5B. The bundle 44 may also include a wrap, sleeve, adhesive, tape, resin or the like to facilitate holding the fibers 28 in the bundled position as illustrated by 45 in FIG. 5B.

Figure 6:
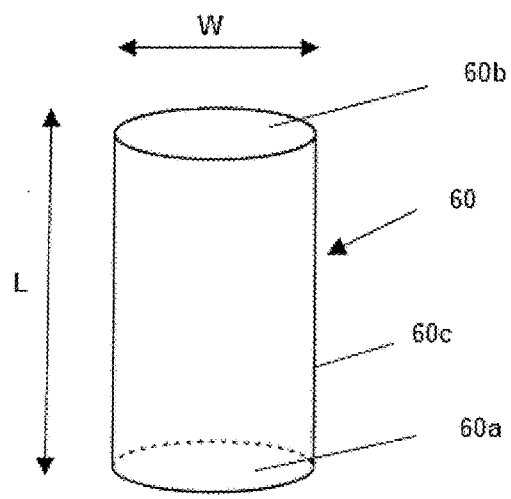
FIG. 6 is a view of an optical mixer in accordance with embodiments of the invention.

FIG. 6 is a view of an optical mixer in accordance with embodiments of the invention. The optical mixer 60 includes a first end surface 60a which may serve as the light input end of the mixer, and a second end surface 60b which may serve as a light output end of the optical 60 mixer. Sidewall 60c extends longitudinally to connect the end surfaces 60a and 60b of the mixer 60. In general, the optical mixer 60 is designed and positioned in the system 10 to achieve light input coupling, mixing and light output coupling suitable to perform the desired lighting function of the fiber panel 32. One or more of these parameters may be favored to achieve a particular optical effect. The perpendicularity or near perpendicularity of surface 60c to 60a/60b is preferable because the TIR effect supports transmission efficiency.

For example, the optical mixer 60 may be positioned in axial alignment with centers of the light source 20 and fiber bundle 44, or offset from optical center. Further, first end surface 60a may be longitudinally spaced from a light emitting surface of the light source 20 such that a radiation angle pattern of the light source 20 is compatible with the light acceptance angle of the mixer 60. One skilled in the art would understand that such distance depends on the refractive index of the optical mixer 60 and the interface medium. In one embodiment, the first end surface 60a of the optical mixer is made to contact the light output surface of the light source 20. In another example, the light source 20 may be embedded in the optical mixer 60 to reduce or eliminate losses associated with refractive index loss due to interfaces with air.

First end surface 60a of mixer 6 may be the same sized area or a different sized area than a light emitting surface of light source 20. Further, the first end surface 60a may be parallel or non-parallel with the light emitting face of the light source 20. For example, parallel to the primary exit face of an LED used as light source 20. According to one embodiment, the second end surface 60b of the optical mixer 60 may also be parallel to the primary emitting plane of light source 2. Other optical components can also be added between light source 20 and fiber bundle 44 to enhance optical characteristics of the optical system.

Figure 7A:
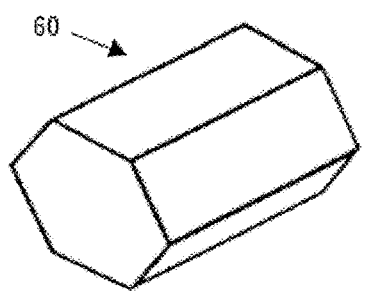
FIGS. 7A-7D show alternative configurations of an optical mixer in accordance with embodiments of the invention.
Figure 7B:
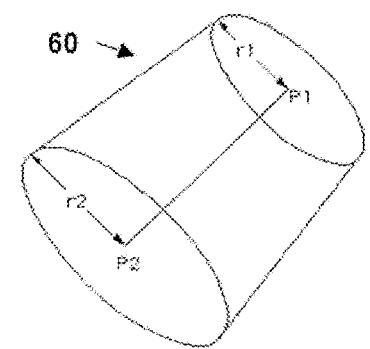
Figure 7C:
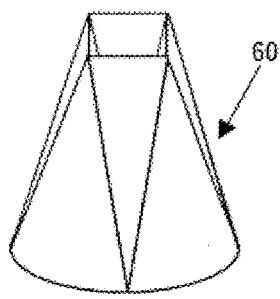
Figure 7D:
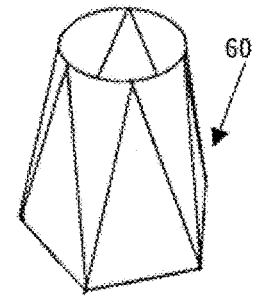

Optical mixer 60 can have a variety of shapes. For example, the first end surface 60a may be the same area and shape as the second end surface 60b, as shown in FIGS. 6 and 7A. Alternatively, the first end surface 60a and the second end surface 60b may have different areas of the same shape as shown in FIG. 7B, or different shapes altogether as shown in FIGS. 7C and 7D. FIG. 7C shows sidewall 60c transitioning from a rectangle cross sectioned first end to a circular second end, while FIG. 7D shows a sidewall transitioning from a circular end to a hexagonal end.

In one embodiment, the first end surface may be concave such that at least a portion of the light source 20 may be provided in a space defined by the concavity. Further, the end surfaces 60a, 60b of the optical mixer may be processed to achieved desired optical effects for example, the first end surface 60a may be polished to facilitate light entry into the optical mixer 60, and/or the surface 60b may be roughened to provide diffuse light output from the optical mixer 60

The optical mixer 60 can be made from silicone, PMMA, PC, glass or any suitable low absorption material. While PMMA generally has the best optical transmission characteristics, silicone may be preferred for its mechanical flexibility. Any material may be used based on translucency, diffusivity and/or color suitable for the particular application. Sidewall 60c may be coated with a reflecting material to facilitate TIR and mixing within the optical mixer 60. Further, the optical mixer 60 may contain other particles, disruptions or substances to achieve a desired optical effect. Disruption may be air bubbles, abrasions or any other anomaly in the material characteristics of the mixer to effect optical properties of the mixer, In one example, phosphors can be included to affect wavelength (color) output of the mixer, and/or diffusing materials included to affect light scattering and enhance spatial uniformity of the light output from the mixer 60. A phosphor, most generally, is a substance that exhibits the phenomenon of luminescence. To emit white light or amber light, the phosphor can include, for example, at least one of the following compounds: $Y_3Al_5O_{12}$: $Ce^{3+}$ (YAG), (Sr, Ba) $2SiO_4$: $Eu^{2+}$, $Ca_x$ $(Si, Al)_{12}$ $(O, N)_{16}$: $Eu^{2+}$. These compounds convert blue light into yellow light. By adjusting the composition of the phosphor, the additive synthesis of these two colors will be a white light or an amber light.

Figure 8A:
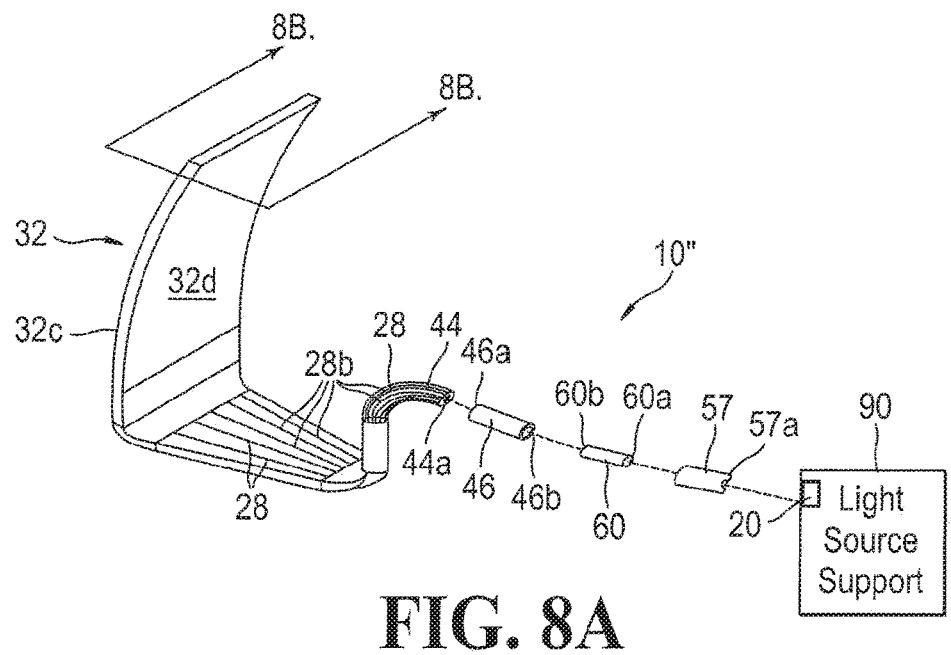
FIG. 8A is an exploded view drawing showing the components of an exterior vehicle lighting device in accordance with an embodiment of the invention.

Size and shape of the optical mixer 60 are selected to meet the desired mixing and coupling characteristics for the optical mixer 60. For example, a length L of the optical mixer 60 can generally be increased to effect more TIR reflections and greater spatial uniformity of light output from the optical mixer 60, while not presenting unacceptable losses to the optical system. In one embodiment, the length of the mixer is 20-40 mm. The ratio of mixer length (L) to mixer diameter is preferably greater than 3.3:1. For example, assuming a 4 mm diameter fiber bundle, the mixer is preferably 4 mm in diameter and at least 15 mm in length. The diameter of the mixer preferably matches a diameter of the fiber bundle. FIGS. 9A and 9B show test results for a bundled fiber diameter study. As seen in table 900 of FIG. 9A, the average bundle diameter is determined for different numbers of fibers. In FIG. 9B, the averages are plotted in a graph. As seen, the relationship of the number of fibers to the bundle diameter by the equation y=0.008x+2.075, where y is the bundle diameter and x is the number of fibers of a given diameter. FIG. 8A is an exploded view showing arrangement of the components of a vehicle lighting device in accordance with an embodiment of the invention. For example, the device 10' may be included in the headlight or taillight of a vehicle V as shown in FIG. 8C. As seen in FIG. 8A, the system 10' includes a panel 32 having a first side 32c through which light from the plurality of optical fibers 28 is emitted. The light may also be emitted on a second side 32d this second side may be partially or fully coated with a reflective material 32m (shown in phantom) in FIG. 8B in order to reflect light through the first side 32c.

Figure 8B:
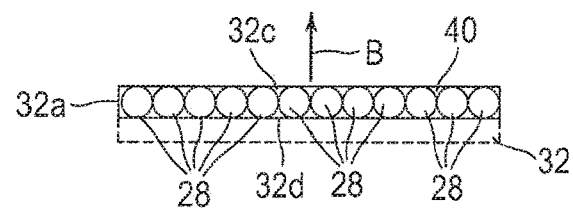
FIG. 8B is a sectional view of the panel of the device in FIG. 8A.
Figure 8C:
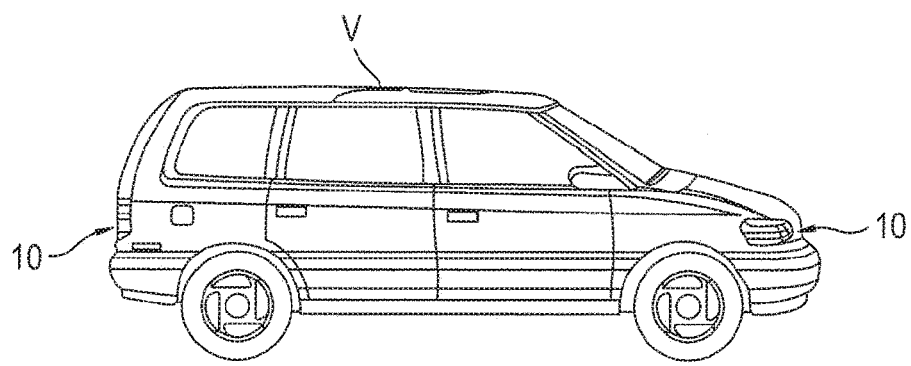
FIG. 8C is a view of a vehicle including a fiber optic light panel device according to embodiments of the invention.
Figure 9A:
FIGS. 9A and 9B show test results for a bundled fiber diameter study.
Figure 9B:
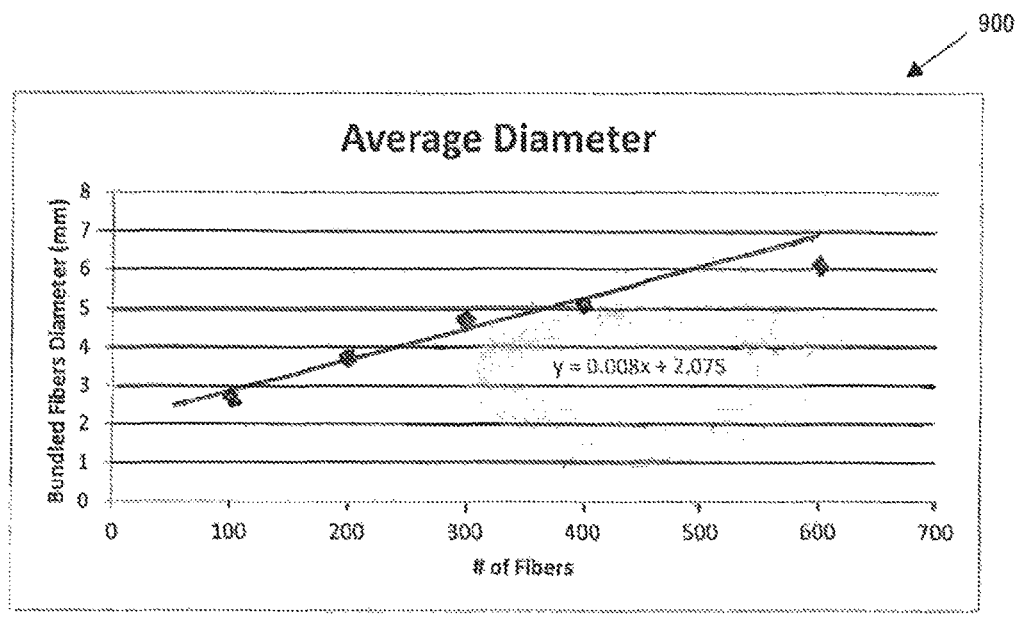

FIG. 8B is a sectional view of the panel of FIG. 8A. As seen, fibers 28 are embedded arranged in a fiber array and embedded in a substrate 40, which could be a polymer, resin or other conventional substrate. Portions 28b of the plurality of optical fibers 28 extend out of the substrate 40 and panel 32 and are gathered and combined in a fiber bundle 44 to define a light-receiving end or input end 44a. In the embodiment of FIG. 8A, the input end 44a becomes operatively positioned in a first end 46a of a coupler 46, as well as opposing end 46b. The coupler 46 may be a ferrule and include a wrap, sleeve, adhesive, tape, resin or the like to facilitate holding the fibers 28 in the bundled position illustrated in FIG. 5B.

Optical mixer 60 has a first and second ends 60a and 60b as discussed above. The first end 60a is coupled to and received in a hollow plug 57, while second end 60b is received in the second end 46b of coupler 46 to optically couple the mixer 60 to the fiber bundle 44. During assembly, an end 57a of the plug 57 is coupled to the light source support of a vehicle light housing to provide optical coupling with the light source 20. In the illustration, the optical mixer 60 is an integral one piece construction made of silicone or plastic.

It should be understood that the illustrations being described show a single light source 20 associated with a single panel 32, but a single light source 20 may be used for multiple panels 32. For example, ends of the optic fibers 28 of different panels 32 may be bundled and coupled to a single coupler 46 associated with the single light source 20. In such configuration, the light source 20 is optically coupled to the optical fibers 28 from multiple panels 32, and a single light source 20 can be used with multiple panels 32. In such a case, it may be necessary to provide a coupler (not shown) that is adapted to receive the multiple bundles of fibers 28. The optical mixer may be shaped to provide three separate input surfaces for coupling three light sources to a fiber bundle.

Advantageously the embodiments described herein are particularly suited for exterior lighting and in environments where it is necessary that the lighting match or conform to the contour or styling of the vehicle V.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

The invention claimed is:

1. A lighting device for a vehicle, comprising:
   a light source for generating light;
   a light panel comprising a plurality of optical fibers arranged in a predetermined form;
   a bundling element for bundling ends of the optical fibers of the light panel together; and
   an optical mixer interposed between the light source and the bundling element, the optical mixer configured to receive at least a portion of said light from the light source, mix said light by total internal reflection and transmit mixed light to the bundling element, wherein the optical mixer is an integral component comprising:
   a light input face configured to input light from the light source, a light output face configured to output light to the input to panel; and an outer sidewall extending longitudinally to connect the light input face to the light output face, wherein said sidewall is configured to provide total internal reflection of said light within the optical mixer and a length of said sidewall causes multiple total internal reflections of the light within the optical mixer such that the optical mixer is configured to provide output light from the output face having greater spatial uniformity than input light entering the input face.

2. The lighting device of claim 1, wherein the light source comprises a solid state light source.

3. The lighting device of claim 1, wherein said plurality of optical fibers are arranged in an array.

4. The lighting device of claim 1, wherein said plurality of optical fibers are arranged in a woven configuration.

5. The lighting device of claim 1, wherein the bundling element comprises a ferrule configured to hold the plurality of fibers in a bundle having a predetermined cross-sectional shape.

6. The lighting device of claim 5, wherein the bundling element comprises adhesive configured to hold the plurality of fibers in said predetermined cross-sectional shape.

7. The lighting device of claim 1, wherein the optical mixer comprises a body having a first surface optically coupled to the light source, a second surface optically coupled to the bundling element and a sidewall extending longitudinally from the first surface to the second surface.

8. The lighting device of claim 7, wherein the optical mixer further comprises a reflective coating provided on said sidewall of the body.

9. The lighting device of claim 8, wherein the sidewall of the optical mixer is tapered.

10. The lighting device of claim 8, wherein the first surface of the optical mixer has a different surface area than a surface area of the second surface.

11. The lighting device of claim 8, wherein the first surface of the optical mixer is shaped to conform to at least one of a geometry and a radiation pattern of the light source.

12. The lighting device of claim 8, wherein the second surface of the optical mixer is shaped to conform to said fiber bundle element.

13. The lighting device of claim 1, wherein the optical mixer further comprises at least one of particles or disruptions in said body of the optical mixer.

14. The optical mixer of claim 1, further comprising a reflective coating at least partially covering said sidewall.

15. The optical mixer of claim 1, further comprising at least one of phosphors and disruptions suspended in the optical mixer.

16. The optical mixer of claim 1, wherein the optical mixer is a solid piece of plastic material.

17. A method of manufacturing a lighting device for a vehicle, comprising:

providing a light source for generating light;

providing a light panel comprising a plurality of optical fibers arranged in a predetermined form;

bundling ends of the optical fibers of the light panel together to form an input to the light panel; and providing an optical mixer between the light source and the bundling element, the optical mixer being an integral component having a light input face configured to input light from the light source, a light output face configured to output light to the input to panel, and an outer sidewall connecting the light input face to the light output face and being configured to provide total internal reflection of said light within the optical mixer, said sidewall having a geometry which causes multiple total internal reflections such that the optical mixer mixes light received at the light input face from the light source to provide mixed light at the light output face having greater spatial uniformity for coupling to the light panel.

18. The method of claim 17, wherein said providing an optical mixer comprises providing an optical mixer is a cylinder shape having a constant diameter to length ratio D:L of at least 3.3:1.

19. The method of claim 18, wherein said providing an optical mixer comprises providing an optical mixer having a constant diameter equal to a fiber bundle diameter determined by y=((0.008 mm)(x))+2.075 mm, where y is the bundled fibers diameter in millimeters and x is the number of fibers in the bundle.

* * * * *